United States Patent [19]

Sigott

[11] 4,057,260
[45] Nov. 8, 1977

[54] DEVICE FOR CONNECTING THE BITS WITH THE CUTTING HEAD OF A DRIFT ADVANCING MACHINE OR THE LIKE

[75] Inventor: Siegfried Sigott, Zeltweg, Austria

[73] Assignee: Vereinigte Osterreichische Eisen-und Stahlwerke, Vienna, Austria

[21] Appl. No.: 651,583

[22] Filed: Jan. 22, 1976

[30] Foreign Application Priority Data

Jan. 23, 1975 Austria .................................. 506/75

[51] Int. Cl.² ............................................. B23B 31/10
[52] U.S. Cl. ...................................... 279/77; 279/76; 279/97
[58] Field of Search ....................... 279/76, 77, 97, 83, 279/86, 104, 105; 175/413, 414, 331, 327, 381, 379

[56] References Cited

U.S. PATENT DOCUMENTS

| 470,462 | 3/1892 | Barnes | 279/86 X |
|---|---|---|---|
| 1,630,526 | 5/1927 | Cogsdill | 279/77 |
| 1,899,326 | 2/1933 | Harrington | 279/77 |
| 2,433,127 | 12/1947 | Kinzbach | 279/77 |
| 2,801,859 | 8/1957 | Kopczynski | 279/97 |
| 2,816,770 | 12/1957 | DeVlieg et al. | 279/97 |
| 2,996,291 | 8/1961 | Krekeler | 279/76 X |
| 3,085,812 | 4/1963 | Rosenthal et al. | 279/76 X |
| 3,342,531 | 9/1967 | Krekeler | 174/413 X |
| 3,586,344 | 6/1971 | Nixon | 279/97 X |

FOREIGN PATENT DOCUMENTS 2,029,430  12/1971  Germany ............................. 279/76

Primary Examiner—Richard B. Lazarus
Assistant Examiner—W. R. Briggs
Attorney, Agent, or Firm—Cushman, Darby & Cushman

[57] ABSTRACT

A drift advancing machine or the like having a cutting head with replaceable bits. Each bit is disposed in a sleeve-shaped bit holder fixed to the cutting head. Arranged at an oblique angle to the axis of each bit is a pivotal locking bolt having a first pivotal position wherein it engages a recessed portion of the bit and prevents removal of the bit, and a second pivotal position wherein it is out of engagement with the recessed portion of the bit and allows removal of the bit. The front end of the locking bolt is shaped particularly for engagement with the bit recessed portion.

9 Claims, 3 Drawing Figures

DEVICE FOR CONNECTING THE BITS WITH THE CUTTING HEAD OF A DRIFT ADVANCING MACHINE OR THE LIKE

BACKGROUND AND SUMMARY OF THE INVENTION

The present invention refers to a device for connecting the bits with the cutting head of a drift advancing machine or the like.

For connecting the bits with a cutting head such that worn bits can easily be interchanged with new bits, and bits are supported within sleeve-shaped bit holders fixed to the cutting head. In known embodiments the bits are secured against falling out of the bit holders by threaded bolts or the like laterally threaded into the sleeve-shaped bit holders such that the bits are pressed against the inner wall of the bit holders and, respectively, by maintaining the bits in their position by spring elements. Such known arrangements suffer from the drawback that during operation of the drift advancing machine or the like, smaller particles of the exploited material and dust enter the bit holder and cause the bit as well as the threaded bolt and, respectively, the spring elements to become clamped within the bit holder so that, as a rule, a worn bit can only be removed with great difficulties.

The invention particularly refers to a device for connecting the bits with the cutting head of a drift advancing machine or the like, comprising sleeve-shaped bit holders fixed to the cutting head and accommodating the bits and aims at avoiding the drawbacks of known devices of the kind described. The invention essentially consists in that within a mounting obliquely arranged to the axis of the sleeve-shaped bit holder a locking bolt is pivotally supported and has a recess on one side of its front end protruding into the cavity of the bit holder, said front end extending in the locking pivotal position of the locking bolt into a recess of the bit, whereas in releasing pivotal position of the locking bolt the recess of the locking bolt is releasing the bit.

In a device according to the invention, the bit can be released by simply rotating the locking bolt for approximately one half revolution, noting that then the recess of the locking bolt does release the bit and the bit can be pulled out of the bit holder. Thus, for releasing the bit, it is only necessary to turn the locking bolt, which has no thread whatsoever, so that manipulation can be effected in a much more simple manner. The invention provides a device in which the bits can be interchanged without any effort and without the aid of special tools.

According to a further feature of the invention, the front end of the locking bolt is extending with play into the recess of the bit, so that on operation the bit is not locked in place within the bit holder but is guided within the bit holder with some play and only secured by the locking bolt against falling out of the bit holder. In this manner, on operation some relative movement is allowed between the bit and the corresponding bit holder, and this relative movement has a result that any particles entering the bit holder are again forced out of the bit holder and cannot adhere to the inner wall of the bit holder and thus cause jamming of the bit.

According to the invention, the bit may have a flattening extending up to the end, accommodated within the bit holder, of the bit, the recess of the bit being worked into said flattening. With cylindrical bit shafts, this flattening is on introducing the bit into the bit holder cooperating with the locking bolt assuming releasing position, so that, when introducing the bit into the bit holder, a guide means is provided which ensures the correct position of the bit relative to the pivotable locking bolt even in releasing position of the locking bolt, so that the locking bolt can then without any difficulties be rotated into its locking position. According to the invention, the bit can alternatively be cylindrical in shape and have its recess formed of an annular groove, noting that conveniently that portion of the bit which is located between the annular groove and the end, accommodated within the bit holder, of the bit, is stepped to a reduced diameter. With such an embodiment, the bit is additionally allowed to rotate within the bit holder on operation, what contributes to preventing the bit to become jammed within the bit holder, which jamming would make the bit difficult to interchange.

Conveniently, the recess of the locking bolt is defined by an inclined plane extending from the front surface of the locking bolt, said inclined plane including with the locking bolt axis an angle $\alpha$ being at least of the same magnitude as that angle $\beta$ under which the locking bolt is inclined relative to the bit axis. In this case the inclined plane is, in releasing position of the locking bolt, parallel relative to the bit axis or including with this axis such an angle that removal of the bit from the bit holder is not obstructed by protruding parts in releasing position of the locking bolt and is acting as guiding surface for the bit to be removed.

According to a preferred embodiment, the locking bolt is obliquely arranged in direction to the bit and accommodated within the bit holder, so that the bit is more reliably anchored within the bit holder when exerting traction forces to the bit in a direction as to remove the bit from the bit holder.

Conveniently, the locking bolt is provided at its free end with an attachment for an engaging tool, said attachment being, for example, formed of a pin or a sleeve extending through the locking bolt, so that the locking bolt can be rotated in a simple manner.

According to the invention, the arrangement is conveniently such that the locking bolt is guided within a bushing threadedly introduced into the holder and is guided therein with interposition of an intermediate layer of high friction coefficient, and in that the front end of the locking bolt is formed as an enlarged head being supported against that bushing. In such an arrangement the locking bolt is exactly guided and reliably secured in position and, in addition, the locking bolt is on account of the intermediate layer prevented from unintentional rotation during operation and thus from becoming released. This arrangement additionally provides the possibility to easily interchange the entity consisting of locking bolt and bushing in case the locking bolt has become damaged.

BRIEF DESCRIPTION OF THE DRAWINGS

The invention is schematically illustrated in the drawing showing various embodiments of the invention.

DETAILED DESCRIPTION OF THE INVENTION

Figure 1:
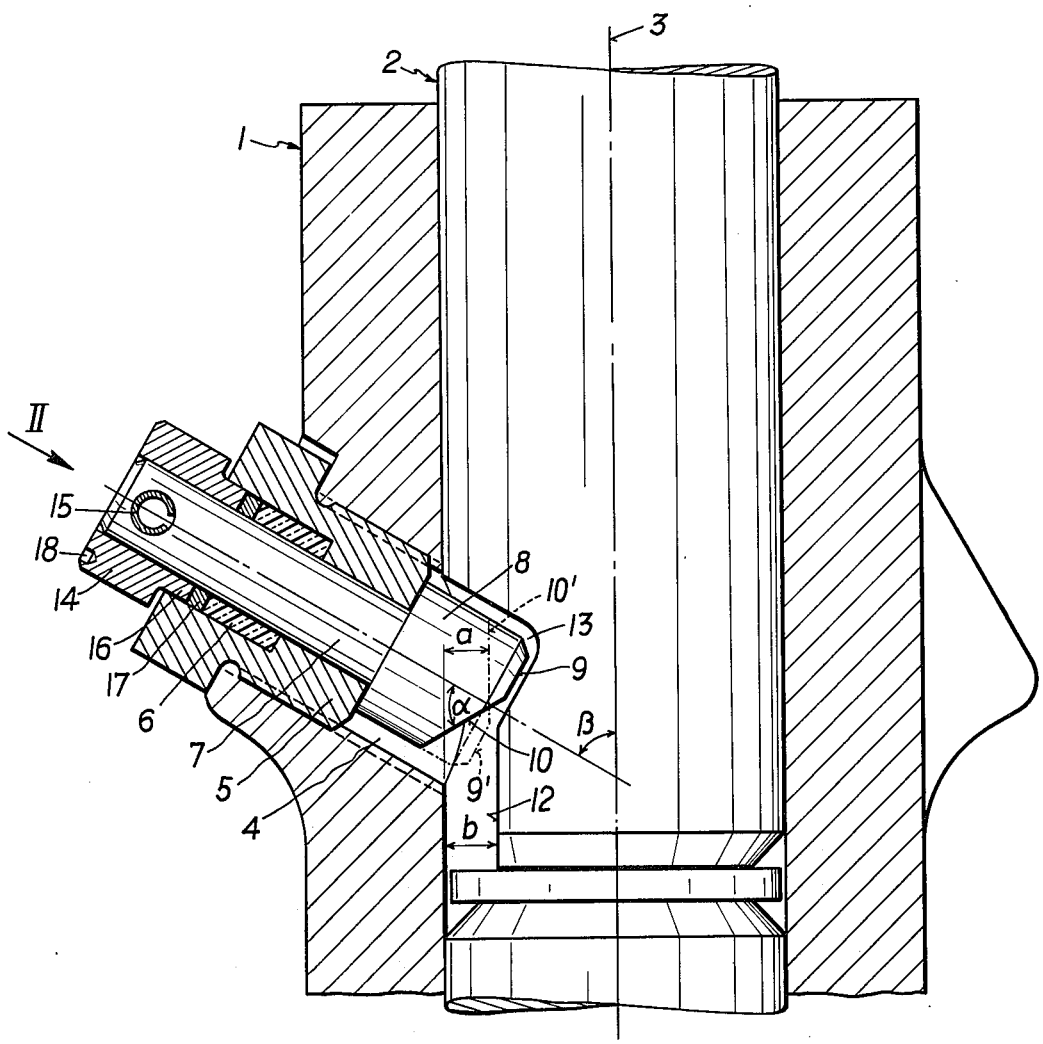
FIG. 1 illustrates a device according to the invention in a longitudinal section.
Figure 2:
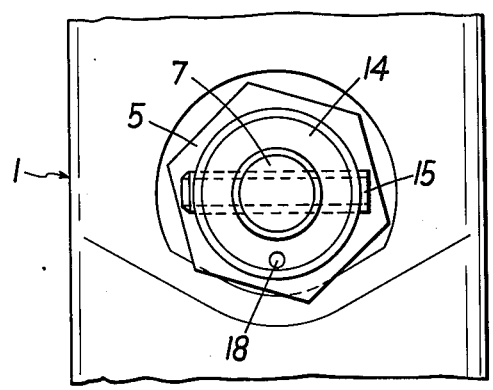
FIG. 2 is a view in direction of arrow II of FIG. 1.

The device shown in FIGS. 1 and 2 comprises a bit holder 1 which is connected with the cutting head not shown in a suitable manner, for example by welding. Within the bit holder 1 a bit 2 is arranged, of which only the portion located within the bit holder is shown in the drawing. The bit holder 1 has a bore 4 extending obliquely relative to the longitudinal axis 3 of the bit holder and having threaded therein a bushing 5. An intermediate layer 6 of high friction coefficient is inserted into a recess within this bushing 5. Within bushing 5 a locking bolt 7 is guided which has an enlarged head 8 being supported against the front surface of the bushing 5.

The bit 2 has a recess 13 and, extending from this recess 13, flattening 12 wich extends up to the end, being accomodated within the bit holder 1, of the bit 2. The front surface 9 of the locking bolt 7,8 is, on one side thereof, recessed by an inclined surface 10. In the locking position as shown in full lines in the drawing, the front surface 9 extends into the recess 13 and prevents the bit 2 from being pulled out of the bit holder 1. When rotating the locking bolt 7,8 for 180°, the front surface 9 is brought into the position 9' and the inclined surface 10 is brought into the position 10'. In this position, which is shown in dashed lines in the drawing, the bit 2 becomes released, because in the position 10' the distance a of the inclined surface 10 from the inner wall of the bit holder 1 is smaller than the distance b of the flattening 12 from this inner wall. The angle α included between the inclined surface 10 and the axis of the locking bolt 7,8 is equal to the angle β under which the axis of the locking bolt 7,8 is inclined relative to the longitudinal axis 3 of the bit holder. In the releasing position as shown in dashed lines, the inclined surface 10' assumes parallel position relative to the flattening 12.

As can be further derived from FIG. 1, the front surface 9 of the locking bolt is extending with play into the recess 13, so that the bit 2 is not locked in place by the locking bolt 7 within the bit holder 1 but is only secured against falling out of the bit holder and is, in addition, allowed to move relative to the bit holder 1. This relative movement between bit 2 and bit holder 1 prevents foreign matter entering the bit holer 1 from becomeing caked therein and thus prevents also the bit 2 from becomming jammed within the bit holder 1.

The free end of the locking bolt 7 is provided with a disc 14 which is connected with the locking bolt by a pin or a slotted clamping sleeve 15 extending through the disc 14 as well as through the locking bolt 7. Said pin or said clamping sleeve 15 are acting as an attachment for applying a tool serving for rotating the locking bolt 7. The disc 14 has an extension 16 which acts, with interposition of a pressure ring 17, on the intermediate layer 6, and thus results, after positioning the disc 14 in place, in compressing the intermediate layer 6 and thus pressing this intermediate layer against the locking bolt 7. In this manner, it is avoided that the locking bolt 7 is unintentionally rotated on operation and releasing the bit 2. A bore 18 is provided on the disc 14 for indicating the position of the locking bolt. In the embodiment shown in the drawing, the arrangement is such that the locking bolt 7 assumes locking position.

The embodiment shown in FIG. 1 can be used for bits of circular cross-section as well as for bits with any other cross-section, for example a rectangular cross-section. It is only require to conform the cross-section of the cavity of the bit holder 1 with the cross-section of the bit 2. With bits of rectangular cross-section, the flattening 12 may be omitted. In this case, however, the head 8 of the locking bolt 7 must be given a shorter length so that the inclined surface 10 does, in releasing position, not extend into the cavity of the bit holder 1.

Figure 3:
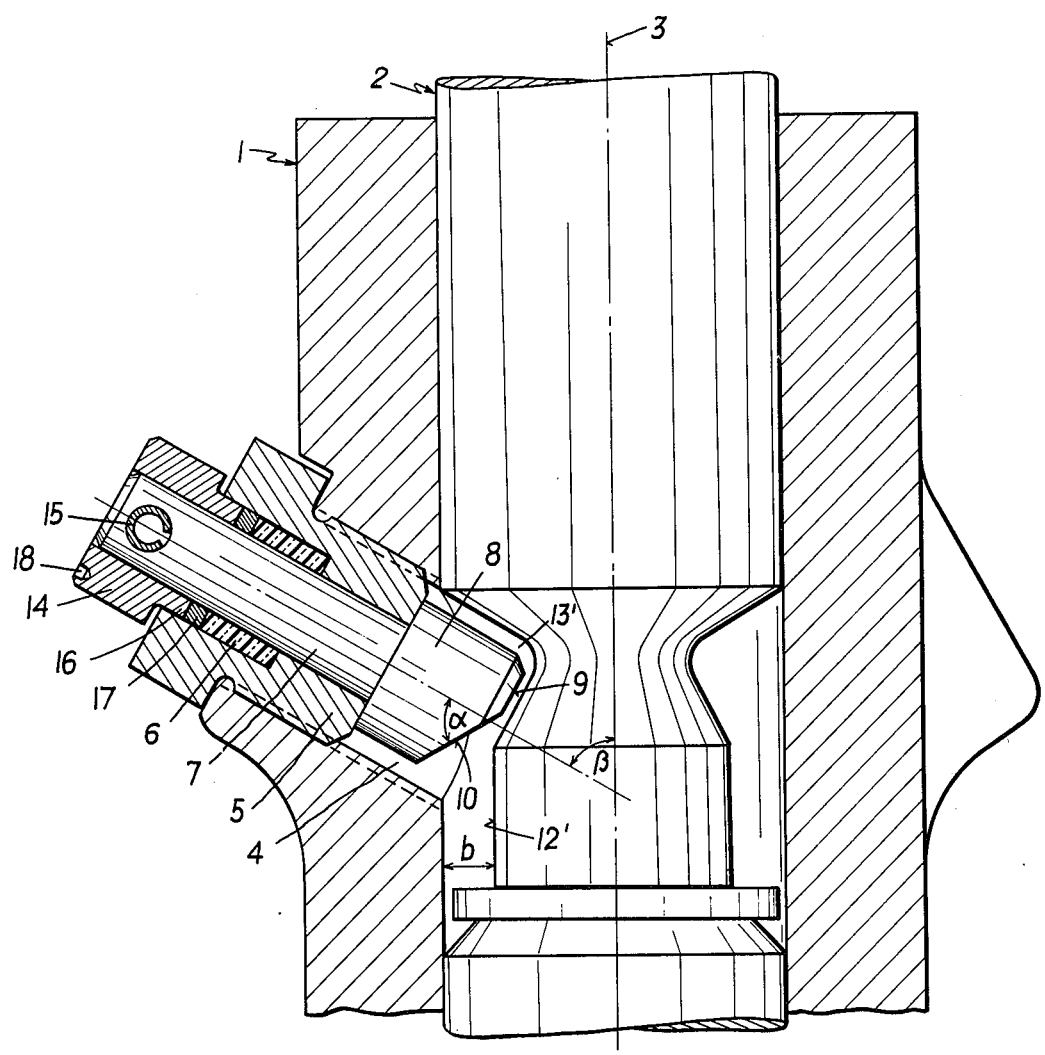
FIG. 3 shows a further embodiment in a longitudinal section.

FIG. 3 shows an embodiment in which the bit 2 has a circular cross-section. The bit holder 1 and the locking bolt 7,8 as well as the bushing 5 is of the same construction as shown in the arrangement according to FIGS. 1 and 2. The recess 13' of the bit is, however, formed of an annular groove and the bit shaft is, beginning from this annular groove 13', stepped to a smaller diameter, noting that the cylindrical surface of this portion stepped to a smaller diameter is designated 12'. In this embodiment, the bit is allowed to freely rotate on operation and in locking position of the bolt as shown in the drawing. With this embodiment, any caking of the bit by dust or the like entered into the bit holder can be reliably avoided.

While the invenion has been herein shown and described in what is presently conceived to be the most practical and preferred embodiment, it will be apparent to those of ordinary skill in the art that many modification may be made thereof within the scope of the invention, which scope is to be accorded the broadcast interpretation of the appended claims so as to emcompass all equivalent structures and devices.

What is claimed is:

1. A device for connecting a bit to a cutting head, comprising:

a sleeve-shaped bit holder fixed to the head and accommodating a bit, said sleeve-shaped bit holder having a cavity disposed along an axis, a locking bolt disposed within a mounting obliquely arranged to the axis of said sleeve-shaped bit holder, said locking bolt being pivotally supported and having a recess on one side of a front end thereof protruding into the cavity of the bit holder, said locking bolt fron end extending in a locking pivotal position thereof into a recess formed in the bit, said locking bolt also having a recessed portion defining with a front surface said front end of said locking bolt, said bit recess and said front end of said locking bolt being sized, so that when said locking bolt is moved into a releasing pivotal position, said front end of said locking bolt does not extend into said bit recess, and removal of the bit is possible, and said recessed portion of said locking bolt being defined by an inclined plane extending from said fron surface of said locking bolt, and inclined plane including with the locking bolt axis an angle that is at least of the same magnitude as the angle at which the locking bolt and mounting therefor are inclined relative to the sleeve-shaped bit holder axis.

2. A device as recited in claim 1 wherein said bit has an end thereof adapted to be accommodated within said bit holder, said end of said bit having a flattened portion, and said bit recess being formed in said flattened portion.

3. A device as recited in claim 1 wherein said bit is cylindrical is shape and wherein an end of said bit is adapted to be received within said sleeve-shaped bit holder, said bit recess being formed as an annular groove, and a portion of said bit between said recess and said bit end being of reduced diameter compared to the diameter of the rest of said cylindrical bit received in said bit holder.

4. A device as recited in claim 1 wherein said mounting for said locking bolt includes means for mounting said locking bolt so that said front end thereof extends with play into said bit recess.

5. A device as recited in claim 1 wherein an end of said bit is accommodated within said bit holder, and wherein said locking bolt is disposed obliquely with respect to said bit end.

6. A device as recited in claim 1 wherein said locking bolt has a free end thereof, and wherein said locking bolt is provided at said free end thereof with an attachment for an engaging tool.

7. A device as recited in claim 1 wherein said locking bolt is mounted within a bushing threadedly received by said bit holder and wherein said locking bolt is guided within said bushing by an interposition of an intermediate layer of high friction coefficient, said locking bolt having an enlarged head supported against said bushing.

8. A device as recited in claim 7 wherein said locking bolt has a free end and wherein a disc is disposed on the free end of said locking bolt, said disc being maintained in position by a pin extending through said locking bolt and said disc being pressed against said intermediate layer.

9. A device as recited in claim 8 wherein said disc has indicia markings disposed thereon.

* * * * *

UNITED STATES PATENT OFFICE
CERTIFICATE OF CORRECTION

Patent No. 4,057,260    Dated November 8, 1977

Inventor(s) Siegfried Sigott

It is certified that error appears in the above-identified patent and that said Letters Patent are hereby corrected as shown below:

In Section [73] of the heading, insert the following after "Stahlwerke":   --Alpine Montan Aktiengesellschaft--.

Signed and Sealed this

Tenth Day of July 1979

[SEAL]

Attest:

Attesting Officer

LUTRELLE F. PARKER
Acting Commissioner of Patents and Trademarks